US012256194B2

(12) United States Patent
Yokota

(10) Patent No.: US 12,256,194 B2
(45) Date of Patent: Mar. 18, 2025

(54) ACOUSTIC TRANSDUCER, ACOUSTIC APPARATUS, AND ULTRASONIC OSCILLATOR

(71) Applicant: Wataru Yokota, Kanagawa (JP)

(72) Inventor: Wataru Yokota, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 248 days.

(21) Appl. No.: 17/965,812

(22) Filed: Oct. 14, 2022

(65) Prior Publication Data

US 2023/0209277 A1 Jun. 29, 2023

(30) Foreign Application Priority Data

Dec. 27, 2021 (JP) ................................ 2021-212841

(51) Int. Cl.
*H04R 7/04* (2006.01)
*H04R 17/10* (2006.01)

(52) U.S. Cl.
CPC ............... *H04R 17/10* (2013.01); *H04R 7/04* (2013.01); *H04R 2217/03* (2013.01); *H04R 2400/11* (2013.01)

(58) Field of Classification Search
CPC . H04R 7/04; H04R 7/045; H04R 7/18; H04R 7/20; H04R 7/24; H04R 17/00; H04R 17/005; H04R 17/10; H04R 2201/003; H04R 2207/021; H04R 2307/207; H04R 2440/01; H04R 2440/05; H04R 2440/07
See application file for complete search history.

(56) References Cited

U.S. PATENT DOCUMENTS 4,228,379 A * 10/1980 Guscott .................. H04R 17/10 310/322
6,965,680 B2 * 11/2005 Yamauchi ............ H04R 31/003 381/190
6,978,032 B2 * 12/2005 Ogura ...................... H04R 7/10 381/190
8,755,556 B2 * 6/2014 Cohen ................... B81B 3/0021 381/176
9,031,266 B2 * 5/2015 Dehe ........................ H04R 7/04 381/174
9,445,200 B2 * 9/2016 Kim .......................... H04R 7/26
9,596,546 B2 * 3/2017 Perois ................ H03H 9/02228
10,848,857 B2 * 11/2020 Brandston ................ H04R 9/06
11,540,059 B2 * 12/2022 Preisler .................. H04R 23/00
11,785,390 B2 * 10/2023 Yokota ..................... H04R 7/06 381/423
11,849,298 B2 * 12/2023 Wei .......................... H04R 7/04
2002/0041694 A1 * 4/2002 Michiels ................ H04R 17/00 381/423

(Continued)

FOREIGN PATENT DOCUMENTS

CN 106941650 A * 7/2017 ............... H04R 7/06
JP 2011-097143 5/2011

(Continued)

*Primary Examiner* — Ryan Robinson
(74) *Attorney, Agent, or Firm* — XSENSUS LLP

(57) ABSTRACT

An acoustic transducer includes: a vibration portion including: a diaphragm; and a vibrator on the diaphragm; a frame surrounding the vibration portion; and a connecting portion connecting the vibration portion and the frame. The vibrator is configured to drive the diaphragm.

11 Claims, 11 Drawing Sheets

(56) References Cited

U.S. PATENT DOCUMENTS

| | | | | |
|---|---|---|---|---|
| 2014/0314268 | A1* | 10/2014 | Lazzari .................... | H04R 7/04 381/430 |
| 2018/0007471 | A1* | 1/2018 | Lembacher .......... | H04R 31/003 |
| 2018/0098139 | A1* | 4/2018 | Arevalo Carreno . | H04R 31/006 |
| 2020/0178000 | A1 | 6/2020 | Niekiel et al. | |
| 2020/0400940 | A1 | 12/2020 | Fujishima et al. | |
| 2022/0264225 | A1 | 8/2022 | Yokota et al. | |

FOREIGN PATENT DOCUMENTS

| | | | | |
|---|---|---|---|---|
| JP | 2012-527147 | | 11/2012 | |
| JP | 2018-157592 | | 10/2018 | |
| JP | 2019-054506 | | 4/2019 | |
| JP | 2020-205592 | | 12/2020 | |
| JP | 2021-001952 | | 1/2021 | |
| TW | 201640915 | A * | 11/2016 | ............. H04R 17/00 |
| WO | WO2010/131151 | A1 | 11/2010 | |
| WO | WO2014/199000 | A1 | 12/2014 | |

* cited by examiner

COMPARATIVE EXAMPLE

COMPARAIVE EXAMPLE

COMPARAITVE EXAMPLE

ACOUSTIC TRANSDUCER, ACOUSTIC APPARATUS, AND ULTRASONIC OSCILLATOR

CROSS-REFERENCE TO RELATED APPLICATIONS

This patent application is based on and claims priority pursuant to 35 U.S.C. § 119(a) to Japanese Patent Application No. 2021-212841, filed on Dec. 27, 2021, in the Japan Patent Office, the entire disclosure of which is incorporated by reference herein.

BACKGROUND

Technical Field

Embodiments of this disclosure relate to an acoustic transducer, an acoustic apparatus, and an ultrasonic oscillator.

Related Art

In recent years, acoustic apparatuses such as earphones have been developed for use to listen to music and view videos, or for use in video conferencing. The acoustic apparatuses use the micro-electromechanical systems (MEMS) technology to implement a speaker driver as an acoustic generator. Many of the speaker drivers, for example, apply a piezoelectric drive MEMS that involves contraction of a piezoelectric film such as lead zirconate titanate (PZT) in response to voltage application, which prompts miniaturization of the speaker drivers. Such a speaker driver is to output sound pressure levels of 100 dB or higher for 1 kHz at a low voltage of less than 10 V with a flat sound pressure level over a wide bandwidth.

SUMMARY

An embodiment of the present disclosure provides an acoustic transducer including: a vibration portion including: a diaphragm; and a vibrator on the diaphragm. The vibrator is configured to drive the diaphragm; a frame surrounding the vibration portion; and a connecting portion connecting the vibration portion and the frame.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
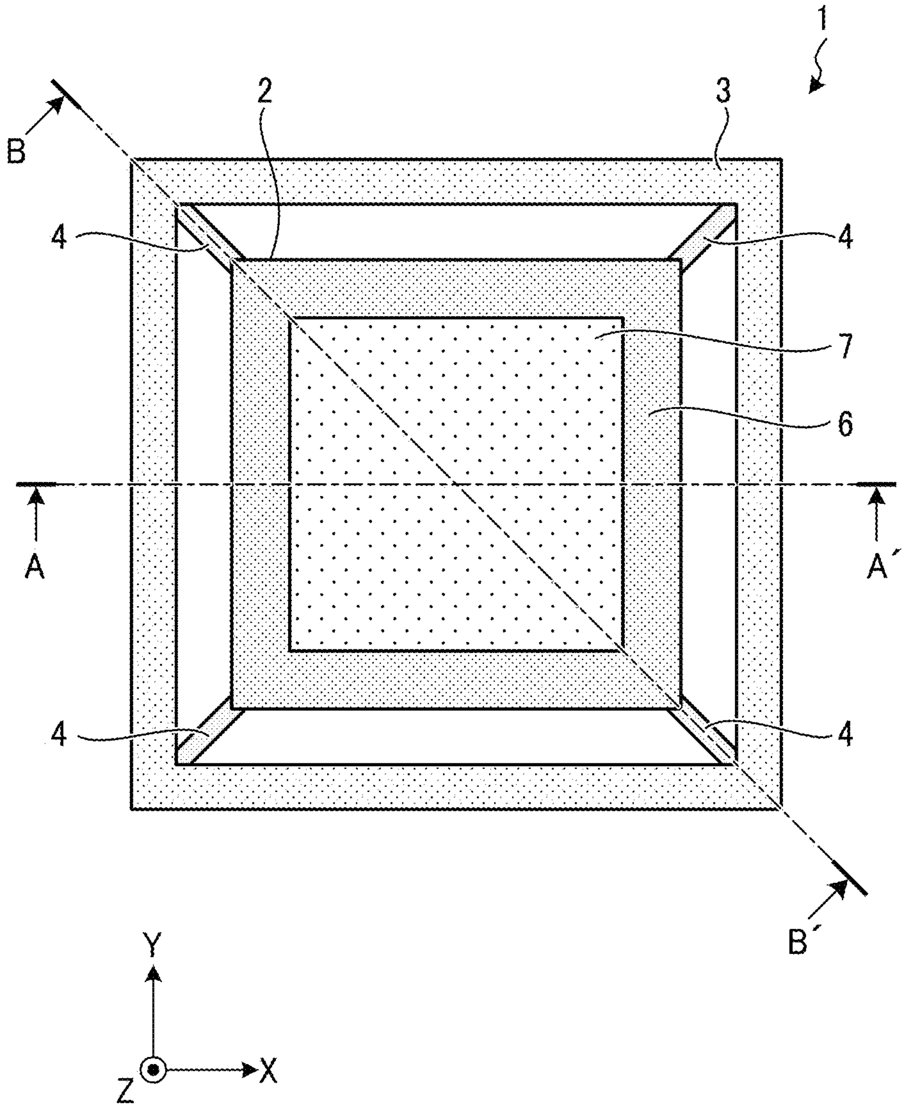
FIG. 1 is a plan view of an acoustic transducer according to a first embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Referring now to the drawings, embodiments of the present disclosure are described below. As used herein, the singular forms "a," "an," and "the" are intended to include the plural forms as well, unless the context clearly indicates otherwise.

To increase the sound level per unit voltage, many speaker drivers using typical piezoelectric drive MEMS have had the silicon thickness of the MEMS portion reduced to increase the driving ease of the speaker surface and increase the volume velocity (the amount of amplitude displacement).

However, such a way of increasing the sound level per unit voltage might cause the occurrence of the resonance of the speaker surface in a drive frequency band due to the silicon thickness of the MEMS portion and fail to achieve the intended flat sound level with a low voltage drive.

Embodiments of the present disclosure achieves a higher sound level per unit drive voltage and driving with a flat sound pressure level in a wide frequency band.

Hereinafter, embodiments of an acoustic transducer, an acoustic apparatus, and an ultrasonic oscillator will be described in detail with reference to the accompanying drawings.

First Embodiment

FIG. 1 is a plan view of an acoustic transducer according to a first embodiment of the present disclosure. As illustrated in FIG. 1, examples of an acoustic transducer 1 includes a piezoelectric drive MEMS speaker driver. The acoustic transducer 1 includes a vibration portion 2, an outer stationary frame 3, and elastic members 4 each serving as a connecting part elastically connecting the vibration portion 2 and the outer stationary frame 3. The outer stationary frame 3 is a frame portion disposed outside the vibration portion 2 to surround the vibration portion 2.

The elastic member 4 is, for example, an elastic spring. The elastic members 4 are provided at end portions of four sides of the square vibration portion 2.

Figure 14:
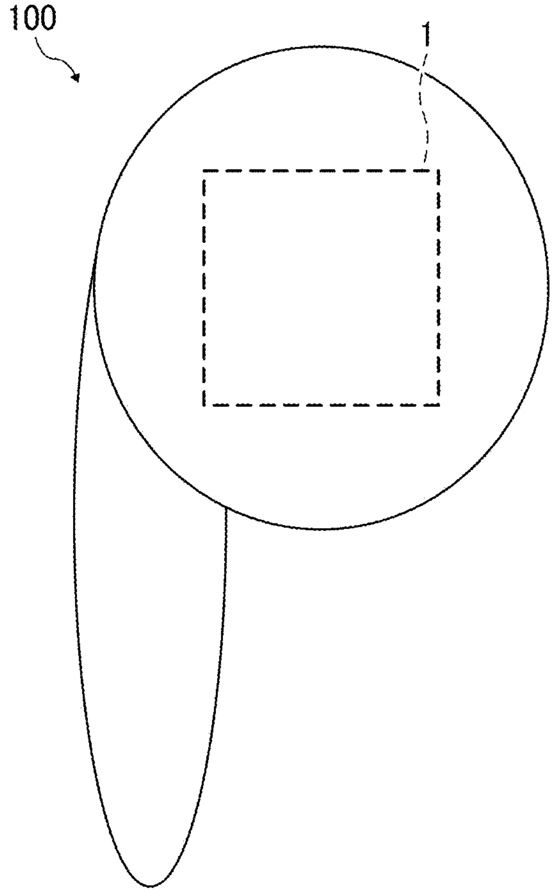
FIG. 14 is an illustration of an acoustic apparatus including an acoustic transducer according to an embodiment.
Figure 15:
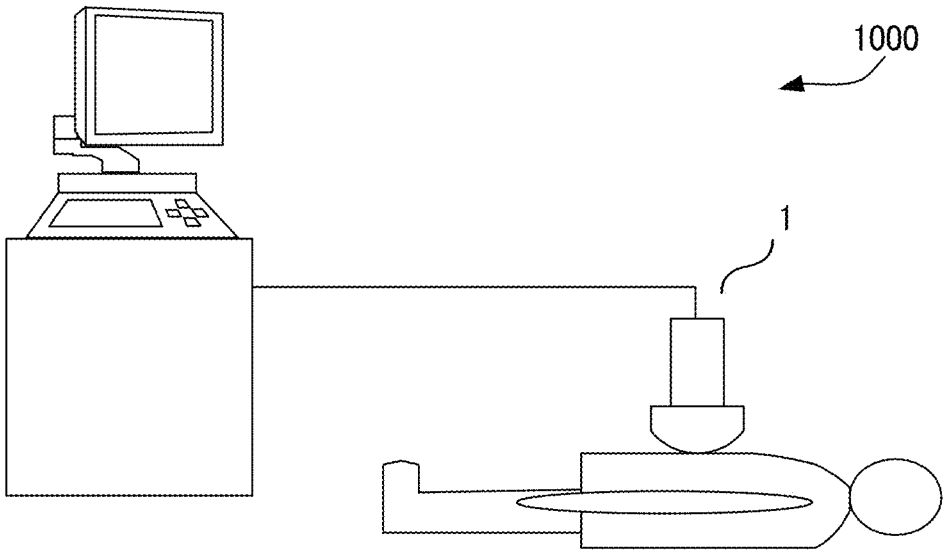
FIG. 15 is an illustration of an ultrasonic oscillator including an acoustic transducer according to an embodiment.

The acoustic transducer 1 illustrated in FIG. 1 serves as an acoustic apparatus such as the piezoelectric drive MEMS speaker driver or an ultrasonic oscillator. FIG. 14 is an illustration of an acoustic apparatus 100 including an acoustic transducer 1 according to an embodiment. The acoustic apparatus 100 is, for example, an earphone. FIG. 15 is an illustration of an acoustic oscillator 1000 including an acoustic transducer 1.

The vibration portion 2 includes a square diaphragm 6 and a piezoelectric driver 7 on the diaphragm 6 to drive the diaphragm 6. The piezoelectric driver 7 is an example of a vibrator including a piezoelectric film. The diaphragm 6 is composed of silicon. The piezoelectric driver 7 is disposed over substantially the entire region of the diaphragm 6.

In response to applying voltage to the piezoelectric driver 7 in a direction (an out-of-plane direction), i.e., a direction vertical to an XY plane, the piezoelectric film included in the piezoelectric driver 7 contracts in the in-plane direction, and the piezoelectric driver 7 with the diaphragm 6 as unimorph deforms in the out-of-plane direction. With a temporal change in voltage applied to the piezoelectric driver 7, the surface of the diaphragm 6 vibrates to generate a pressure wave in the ambient air, which is sensed by a person as sound.

An input voltage waveform is electrically converted from a waveform of sound to be reproduced. This voltage waveform is input to the piezoelectric driver 7 to reproduce the sound.

Figure 2:
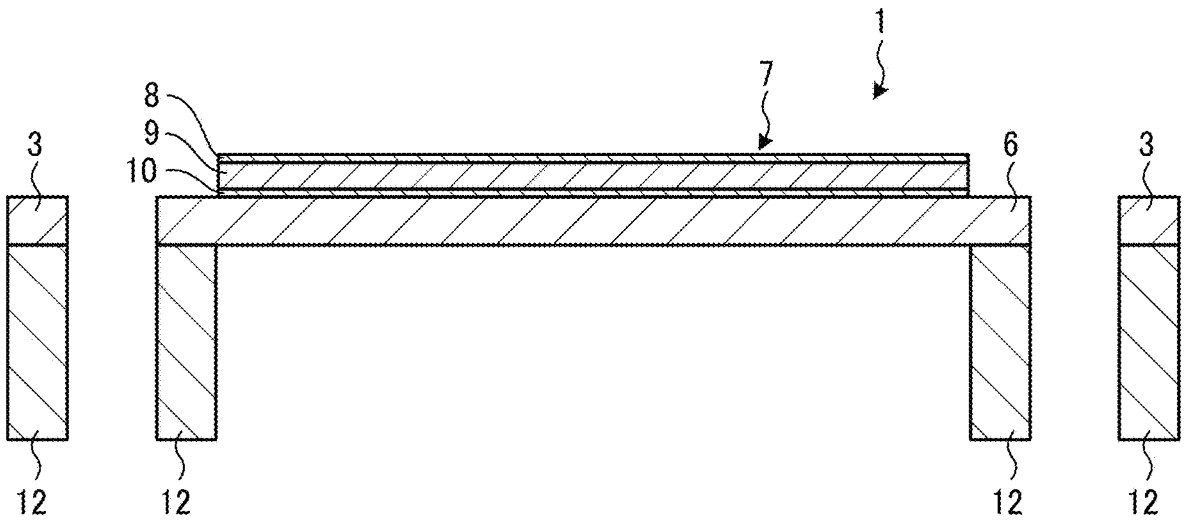
FIG. 2 is a cross-sectional view of the acoustic transducer taken along line A-A' in FIG. 1.
Figure 3:
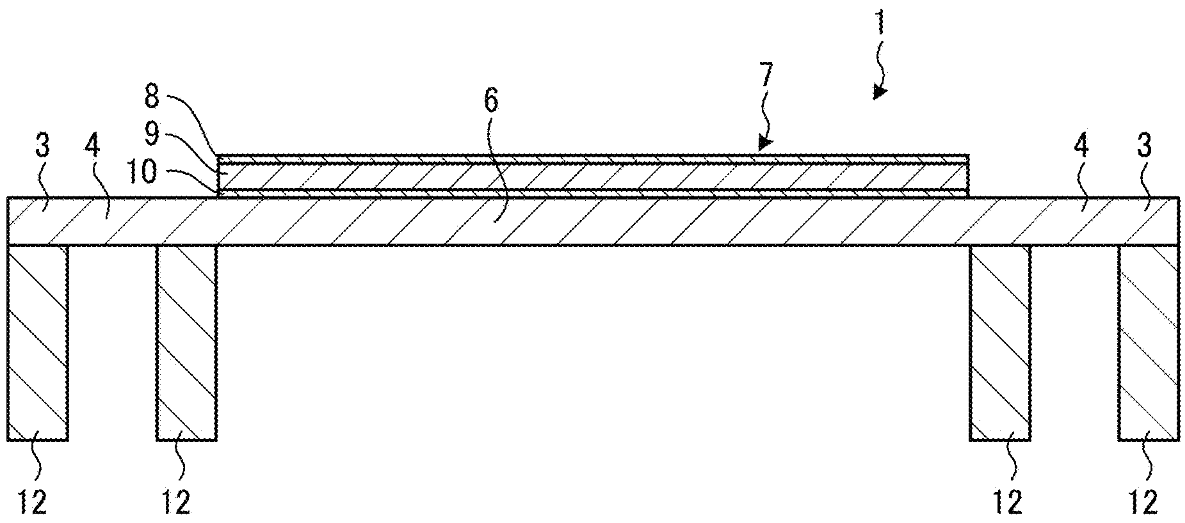
FIG. 3 is a cross-sectional view of the acoustic transducer taken along line B-B' in FIG. 1.

FIG. 2 is a cross-sectional view of the acoustic transducer 1 taken along line A-A' in FIG. 1. FIG. 3 is a cross-sectional view of the acoustic transducer 1 taken along line B-B' in FIG. 1.

The piezoelectric driver 7 has a structure in which a piezoelectric material 9 is disposed between an upper electrode 8 and a lower electrode 10. The diaphragm 6 is bonded to and supported by a support layer 12.

The acoustic transducer 1 has a structure including the vibration portion 2 and the elastic member 4 between the outer stationary frame 3 and the vibration portion 2 when viewed from the outer stationary frame 3. This structure provides a resonance mode in the out-of-plane direction includes two modes: a resonance mode in which the vibration displacements of the vibration portion 2 and the elastic member 4 are coincident with each other (i.e., the vibration portion 2 and the elastic member 4 vibrate at the same phase); and an antiresonance mode in which the vibration displacements of the vibration portion 2 and the elastic member 4 are inverted by 180° (i.e., the vibration portion 2 and the elastic member 4 vibrate at the phases shifted by 180° from each other.

The elastic member 4 may be composed of a diaphragm 6 made of silicon as illustrated in FIG. 3.

In this case, the spring constant of each elastic member 4 can be changed by changing the thickness of the diaphragm 6 composed of silicon or the dimension value of each elastic member 4, and the intended resonance and anti-resonance can be designed. The elastic member has a thickness preferably ranging of from 5 to 40 μm to achieve the intended sound level.

In FIG. 3, the elastic members 4 are integrated with the diaphragm 6 composed of silicon. This configuration is only one example. In some examples, the elastic members 4 are independent from the diaphragm 6.

Examples of material of such elastic members 4 include materials usable for MEMS devices such as silicon, SiC, and epoxy-based materials, and materials usable for 3D printers such as ABS-resin, PLA-resin, ASA-resin, PP-resin, PC-resin, nylon resins, acrylic resins, PETG, and thermoplastic-polyurethane. The elastic members 4 are preferably composed of the same material as that of the diaphragm 6 to simplify the manufacturing process.

Specifics of the peak of a sound pressure level are described below.

Figure 4:
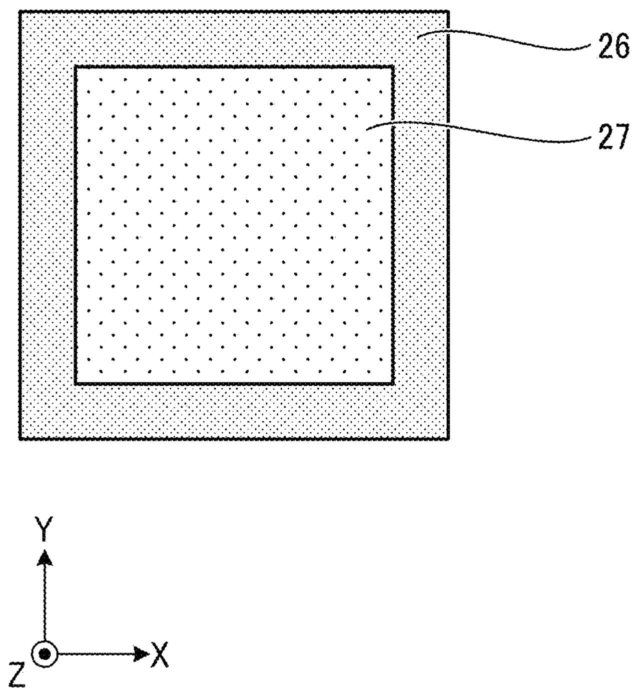
FIG. 4 is a plan view of an acoustic transducer according to a comparative example.

First, the peak of the sound pressure level of an acoustic transducer according to a comparative example. FIG. 4 is a plan view of an acoustic transducer according to a comparative example.

The acoustic transducer according to the comparative example in FIG. 4 includes a square silicon diaphragm 26 and a piezoelectric driver 27 on the diaphragm 26 to drive the diaphragm 26. In the acoustic transducer according to the comparative example, the piezoelectric film of the piezoelectric driver 27 contracts in the in-plane direction in response to the voltage applied to the piezoelectric driver 27 in the out-of-plane direction vertical to the XY plane. Then, the piezoelectric driver 27 as a unimorph with the diaphragm 26 deforms in the out-of-plane direction. With a temporal change in the voltage applied to the piezoelectric driver 27, the diaphragm 26 accelerates in the out-of-plane direction to generate a pressure wave in the ambient air, which is sensed by a person as sound.

Figure 5:
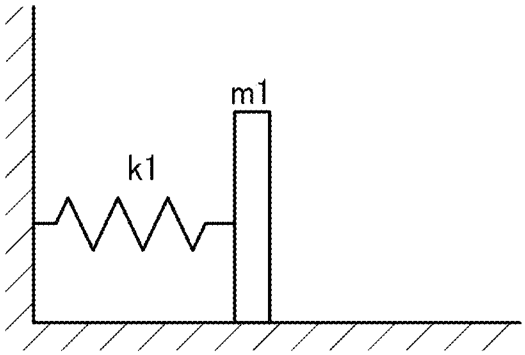
FIG. 5 is an illustration of the operation of the acoustic transducer in FIG. 4.
Figure 6:
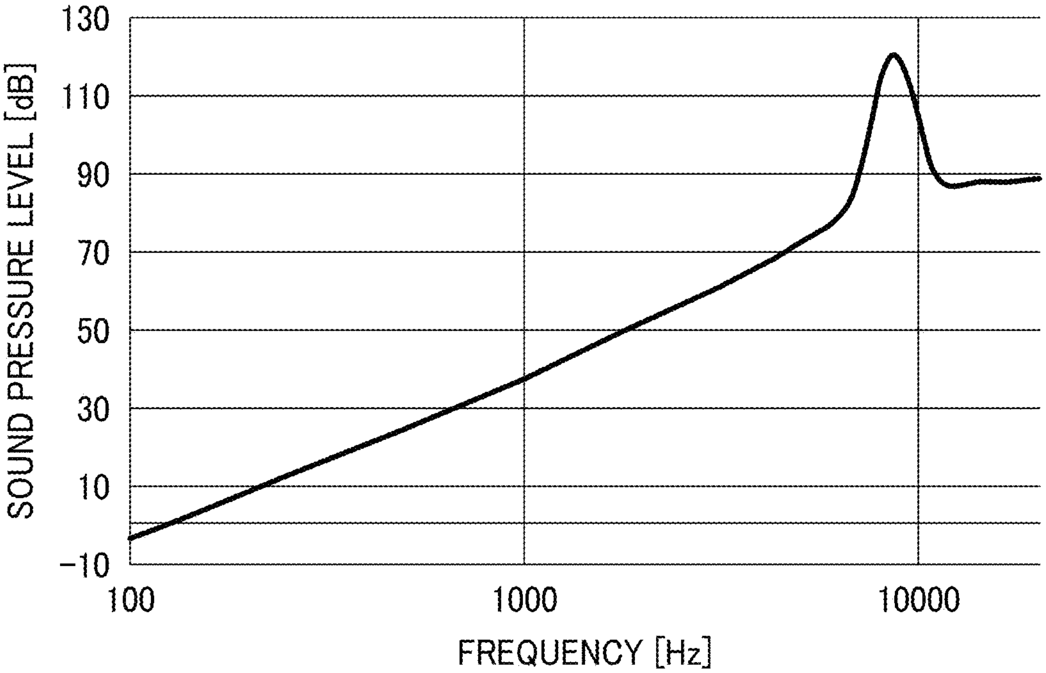
FIG. 6 is a graph of the peak sound pressure level of the acoustic transducer in FIG. 4.

FIG. 5 is an illustration of the operation of the acoustic transducer according to the comparative example in FIG. 4. FIG. 6 is a graph of the peak sound pressure level of the acoustic transducer according to the comparative example in FIG. 4. In FIG. 5, $m_1$ represents the total mass of the piezoelectric driver 27 and a portion of the diaphragm 26 where the piezoelectric driver 27 is on the surface area of the portion along the z-axis (i.e., in a direction from the front side to the rear side of the drawing sheet) in FIG. 4, and $k_1$ represents the elastic coefficient of the piezoelectric driver 27 in FIG. 4. The mass $m_1$ is the mass of the inside area (on which the piezoelectric driver 27 is disposed) excluding the other portion of the diaphragm 26, whose surface area is outside the piezoelectric driver 27. In this configuration, a primary resonance frequency co is given by the following formula (1). The amplitude of the diaphragm 6 becomes maximum at this frequency, indicating a peak sound pressure level.

$$\omega = \sqrt{\frac{k_1}{m_1}} \tag{1}$$

In the comparative example in which the acoustic transducer has a cantilever structure as illustrated in FIG. 5, the resonance mode to generate vibration in the out-of-plane direction of the piezoelectric driver 27 may occur in an operation frequency band of 20 to 30 kHz. When such a resonance mode occurs, the surface speed of the acoustic transducer reaches a peak at the frequency of the resonance mode, and the frequency response also reach a peak at the sound pressure level of the resonance mode.

In view of these findings, the cantilever acoustic transducer according to the comparative example whose peak sound pressure level appears within its operation frequency band is to be driven in a frequency band in which a resonance frequency is not included, or an original input signal is to be modulated. This, however, might degrade the reproducibility of sound to be produced by the acoustic transducer.

Figure 7:
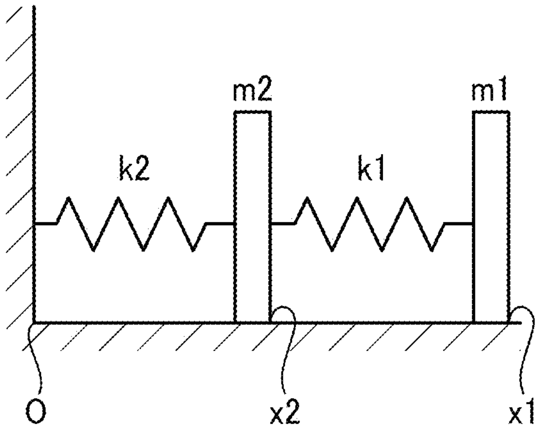
FIG. 7 is an illustration of the operation of an acoustic transducer according to an embodiment of the present disclosure.
Figure 8:
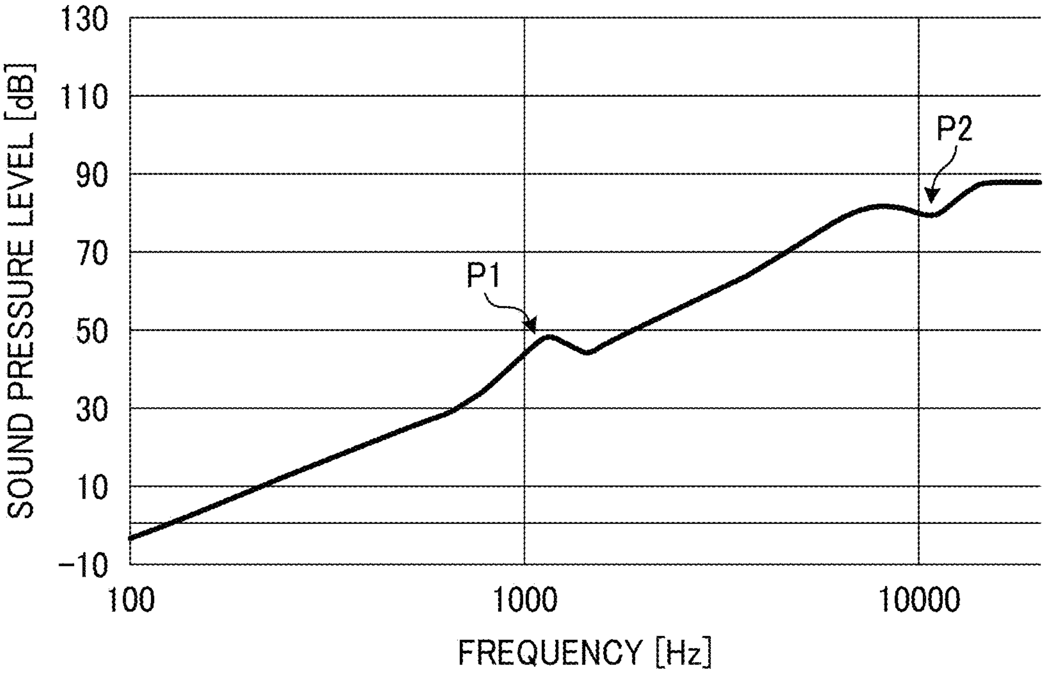
FIG. 8 is a graph describing the peak sound pressure level of an acoustic transducer according to an embodiment of the present disclosure.

The following describes the peak sound pressure level of the acoustic transducer 1 according to an embodiment of the present disclosure is described. FIG. 7 is an illustration of the operation of the acoustic transducer 1. FIG. 8 is a graph of a peak sound pressure level of the acoustic transducer 1, according to an embodiment of the present disclosure.

In FIG. 7, $m_1$ represents the total mass of the piezoelectric driver 7 and a portion of the diaphragm 6 on the surface area of which the piezoelectric driver 7 is disposed along the z-axis in FIG. 1, and $m_2$ represents the total mass of the support layer 12 and a portion of the diaphragm 6 on the surface area of which the support layer 12 is disposed as illustrated in FIG. 2. Further, $k_1$ represents the spring constant of the diaphragm 6, and $k_2$ represents the combined spring constant of the four elastic springs (elastic members 4) in FIG. 1. The mass $m_1$ in FIG. 7 is the mass of the inside area (on which the piezoelectric driver 7 is disposed) excluding the other portion of the diaphragm 6 whose surface area is outside the piezoelectric driver 7. The mass $m_2$ in FIG. 7 is the mass of the outside area (in which the support layer 12 is disposed) excluding the other portion of the diaphragm 6 on the surface area of which the piezoelectric driver 7 is disposed.

In FIG. 7, the right-to-left directions refers to the x-axis. Further, $x_2$ represents the position of the right edge of the mass $m_2$ portion of the diaphragm 6, and $x_1$ represents the position of the right edge of the mass $m_1$ portion of the diaphragm 6 in the acoustic transducer 1. The acoustic transducer 1 satisfies the following simultaneous equation:

$$m_1\ddot{x}_1=-k_1(x_1-x_2)$$

$$m_2\ddot{x}_2=-k_2x_2+k_1(x_1-x_2) \tag{2}$$

Solving the eigenvalues of the above-described simultaneous equations yields:

$$\lambda=-\frac{1}{2}\times\frac{m_2k_1+m_1(k_1+k_2)}{m_1m_2}\pm\frac{\sqrt{A}}{2} \tag{3}$$

$$A=\left(\frac{m_2k_1+m_1(k_1+k_2)}{m_1m_2}\right)^2-4\times\frac{k_1^2}{m_1m_2}$$

Since the eigenvalue has two solutions, it is understood that the structure of the acoustic transducer 1 has two resonance points. The vibration phase differs between a large eigenvalue and a small eigenvalue of the solutions. With a small eigenvalue, the mass $m_2$ and the mass $m_1$ of the vibrating membrane vibrate at the same phase. With a large eigenvalue, these masses $m_2$ and $m_1$ vibrate at the phases shifted by 180° from each other. Such a phase shift by 180° allows a reduction in volume velocity and thus reduces the peak sound pressure level. With the same phase between the mass $m_1$ and the mass $m_2$, the peak amplitude displacement increases.

It is known that a power spectrum for a vibration frequency of a speaker is proportional to the fourth power of the frequency in a low frequency range smaller than the resonance, does not depend on the frequency in a middle frequency range, and is inversely proportional to the second power of the frequency in a high frequency range sufficiently higher than the resonance frequency. A structure having flat characteristics with a small peak sound pressure level can be obtained by designing, from the above equation, an eigenvalue having the same phase in a low-pitched sound range where the radiation efficiency decreases, and designing an eigenvalue having a phase shifted by 180° in a high-pitched sound range where the radiation efficiency decreases.

As described above, for the resonance mode frequency obtained by fixing the end portion of the vibration portion 2, the resonance mode frequency of the acoustic transducer 1 of the present embodiment is low, and the antiresonance mode frequency is high. When the vibration on the surface of the acoustic transducer 1 is converted into a sound pressure level, a vibration with a higher frequency is converted to a sound pressure level with a higher conversion efficiency. Thus, changing the resonance mode to a low frequency band allows a reduction in the sound pressure level. In the antiresonance mode, since the velocities of the vibration portion 2 and the elastic member 4 in the out-of-plane direction are opposite to each other, an increase in the volume velocity (amplitude displacement amount) becomes smaller than that at the normal peak. Such a configuration allows a reduction in the peak sound pressure level.

As presented in FIG. 8 for an example of the peak sound pressure level of the acoustic transducer 1, arrow P1 indicates the peak sound pressure level in the resonance mode, and arrow P2 indicates a portion with the flat characteristics due to the antiresonance mode. As presented in FIG. 8, the acoustic transducer 1 has a small peak sound pressure level and the flat characteristics.

As described above, the acoustic transducer 1 according to the present embodiment includes: elastic members 4 at the outer peripheral portion of the vibration portion 2 on which a piezoelectric film is formed; and an outer stationary frame 3 disposed outside the outer peripheral portion and coupled to the elastic members 4. This configuration allows a higher sound pressure level per unit drive voltage and drive with a flat sound pressure level in a wide frequency band.

The configuration of the vibration portion 2 is not limited to the configuration in FIG. 1. In another example, the diaphragm 6 may be provided with a cavity to increase the driving speed of the vibration portion 2.

First Modification

Figure 9B:
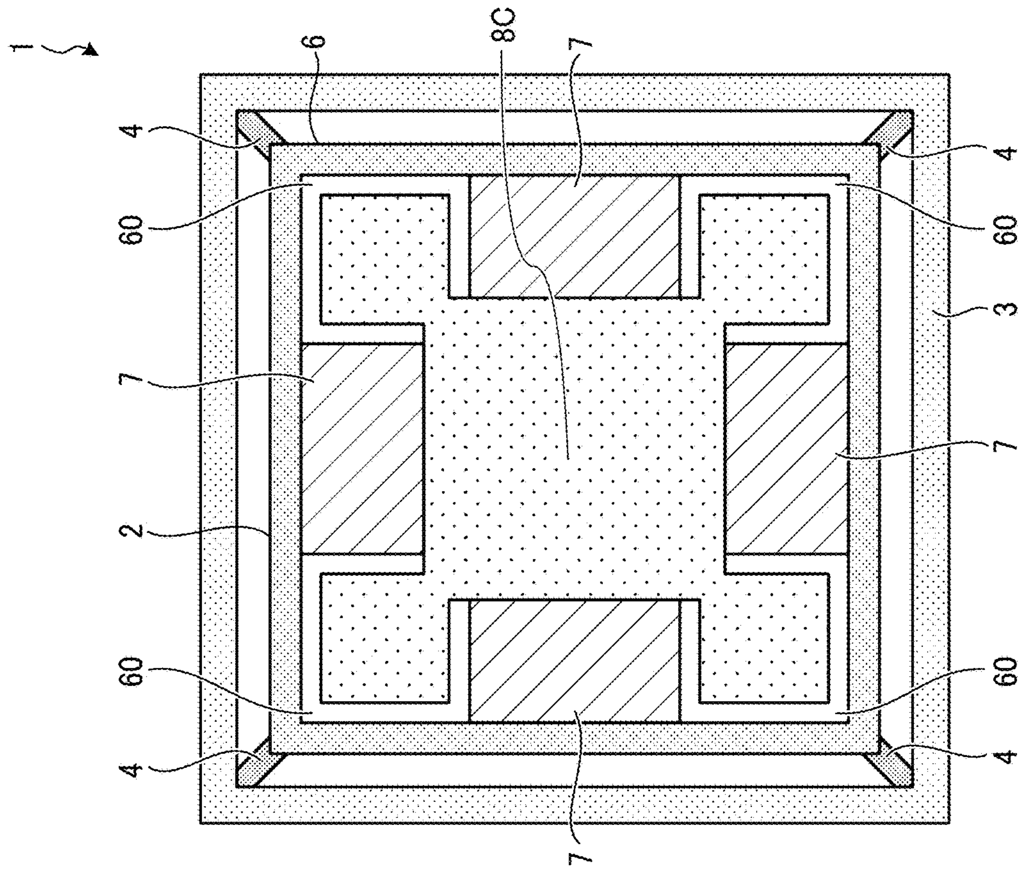
FIGS. 9A and 9B are illustrations of an acoustic transducer according to a modification of the first embodiment of the present disclosure.
Figure 9A:
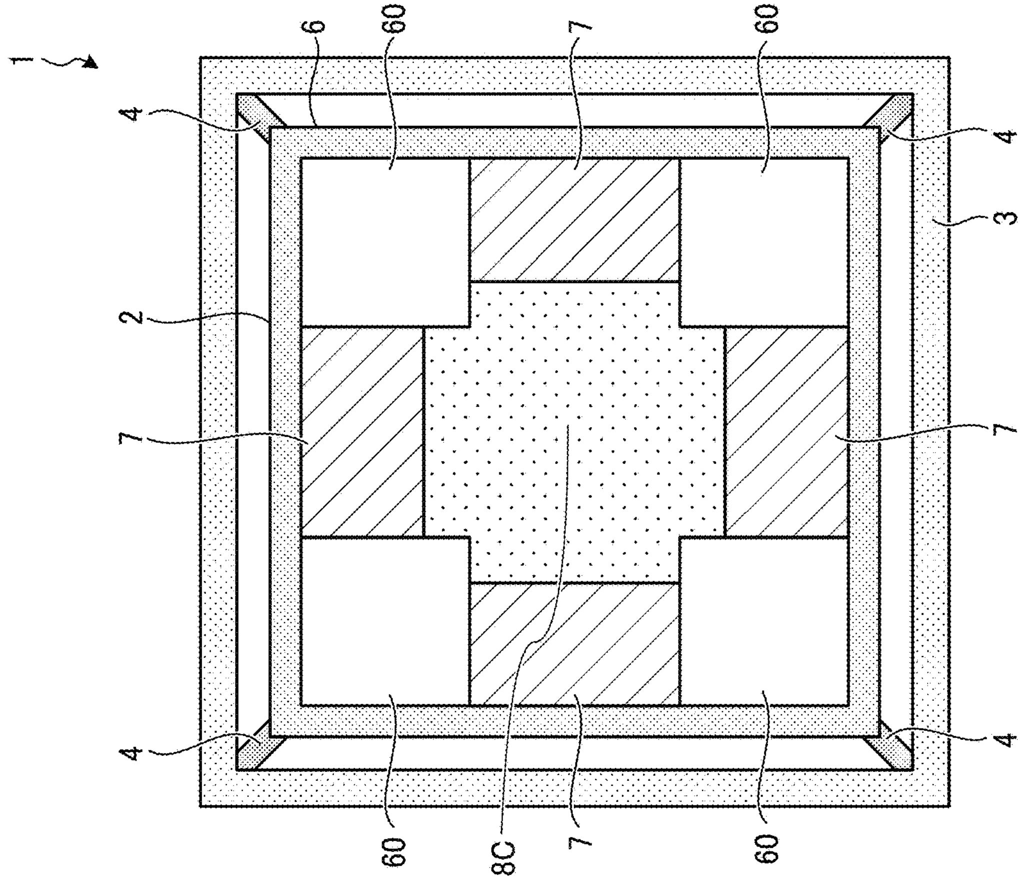

FIGS. 9A and 9B are illustrations of an acoustic transducer according to a modification of the first embodiment of the present disclosure.

The first variation illustrated in FIG. 9 is different from the above-described embodiment illustrated in FIG. 1 in that the piezoelectric drivers 7 are not disposed at the four corners of the diaphragm 6. The configuration of the first modification reduces or prevents a reduction in the sound pressure level due to an increase in the bending elasticity of the diaphragm 6, which is caused by the stiffness of the piezoelectric drivers 7 at the four corners of the diaphragm 6. In addition, the acoustic transducer of the first modification in FIGS. 9A and 9B is provided with cutouts 60 at the four corners of the diaphragm 6. In other words, the diaphragm 6 has multiple cutouts 60 at portions of the diaphragm 6 excluding a center portion 8C thereof.

The cutouts 60 at the four corners of the diaphragm 6 may be square cutouts 60 each adjacent to two of the piezoelectric drivers 7 as illustrated in FIG. 9A, or may be L-shaped cutouts 60 each adjacent to two of the piezoelectric drivers 7 as illustrated in FIG. 9B. In this case, the vibrator (the piezoelectric driver 7) is between two adjacent cutouts 60 of the multiple cutouts 60.

Any one of these configurations reduces or prevents an increase in the bending elasticity of the diaphragm 6 and a reduction in the sound pressure level due to the stiffness of the four corners of the diaphragm 6.

Second Modification

Figure 10:
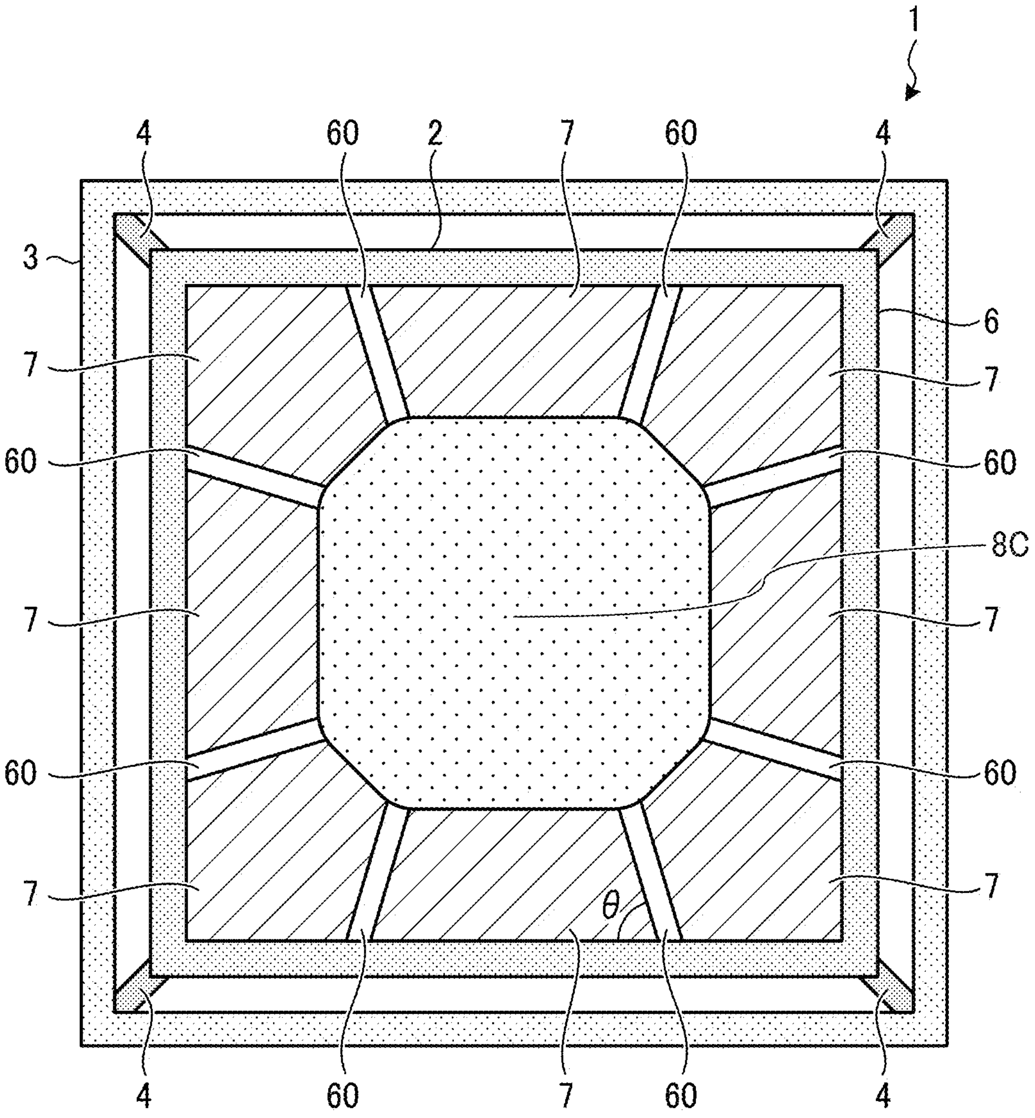
FIG. 10 is an illustration of an acoustic transducer according to a second modification of the first embodiment of the present disclosure.

FIG. 10 is an illustration of an acoustic transducer according to a second modification of the first embodiment of the present disclosure.

The second modification in FIG. 10 differs from the first embodiment in FIG. 1 in that the acoustic transducer 1 in FIG. 10 includes multiple cutouts 60 each having a different longitudinal direction. In the modification of FIG. 14, the angle $\alpha$ between the longitudinal direction of each of the multiple cutouts 60 and a corresponding side of the diaphragm 6 is an angle other than 90°. The second modification prevents a reduction in the area of the center portion 8C of the diaphragm 6 while allowing an increase in the length of the cutouts 60, thus preventing a reduction in the sound pressure level.

Second Embodiment

A second embodiment will be described.

In the third embodiment, the elastic member 4 has a shape different from that of the first embodiment. Like reference signs are given to elements similar to those described in the first embodiment, and their detailed description is omitted in the following description of the first embodiment of the present disclosure.

Figure 11:
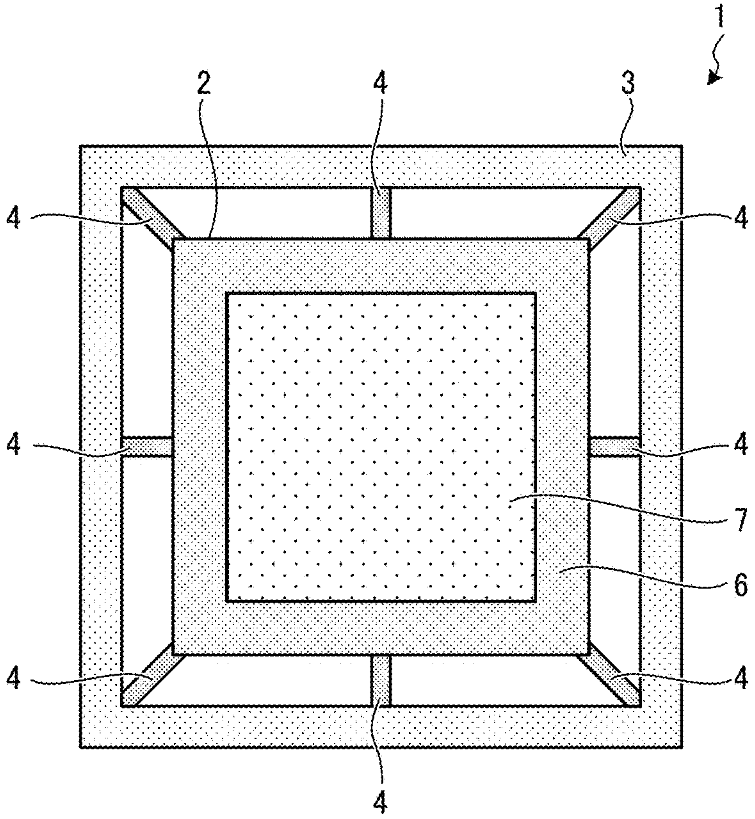
FIG. 11 is a plan view of an acoustic transducer according to a second embodiment of the present disclosure.

FIG. 11 is a plan view of an acoustic transducer according to a second embodiment of the present disclosure. In the acoustic transducer 1 according to the first embodiment, the elastic members 4 are provided at the end portions of the four sides of the square vibration portion 2. However, no limitation is not intended herein. As illustrated in FIG. 11, the acoustic transducer 1 according to the second embodiment includes other elastic members 4 in the vicinity of the center portions of the four sides of the square vibration portion 2, in addition to the end portions of the sides of the vibration portion 2.

Using more elastic members 4 of the same size allows a higher resonance frequency of the antiresonance mode and a higher degree of design flexibility.

First Modification

Figure 12:
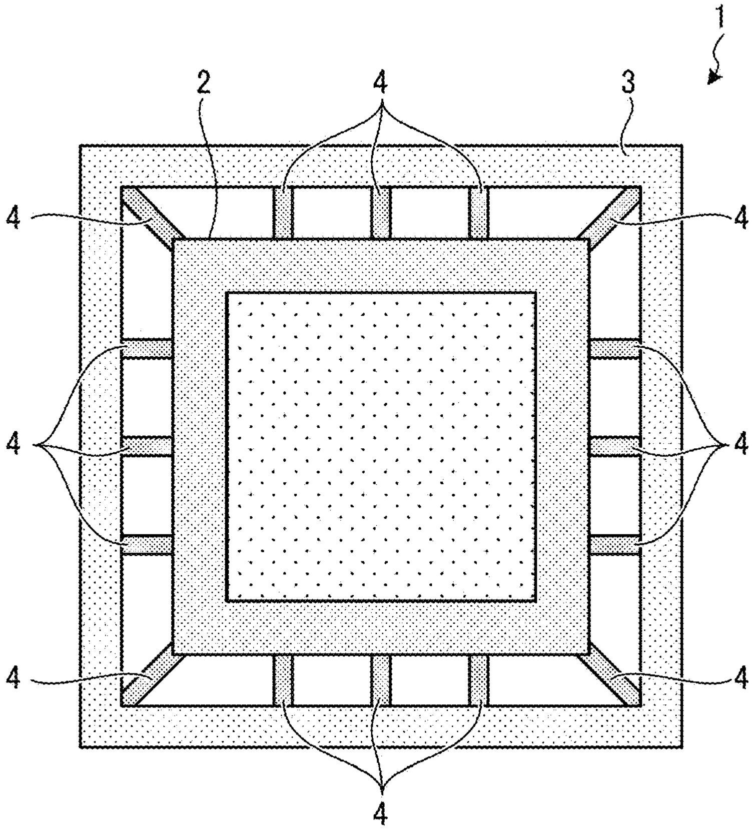
FIG. 12 is a diagram for explaining a first modification of the second embodiment.

FIG. 12 is an illustration of an acoustic transducer according to a first modification of the second embodiment of the present disclosure.

The acoustic transducer 1 of the first modification in FIG. 12 further includes two elastic members 4 for each side of the square vibration portion 2 of the second embodiment in FIG. 11.

With an increasing combined spring elastic modulus of multiple elastic members 4, an acoustic transducer 1 as a piezoelectric drive MEMS speaker driver can be transported without being broken, thus allowing a higher transportability. However, an increasing combined spring elastic modulus of multiple elastic members 4 causes the resonance frequency of the resonance mode to shift to higher frequencies.

Third Embodiment

A third embodiment will be described.

In the third embodiment, the elastic member 4 has a shape different from those of the first and second embodiments. Note that like reference signs are given to elements similar to those described in the first embodiment and the second embodiment, and their detailed description is omitted in the following description of the third embodiment of the present disclosure.

Figure 13:
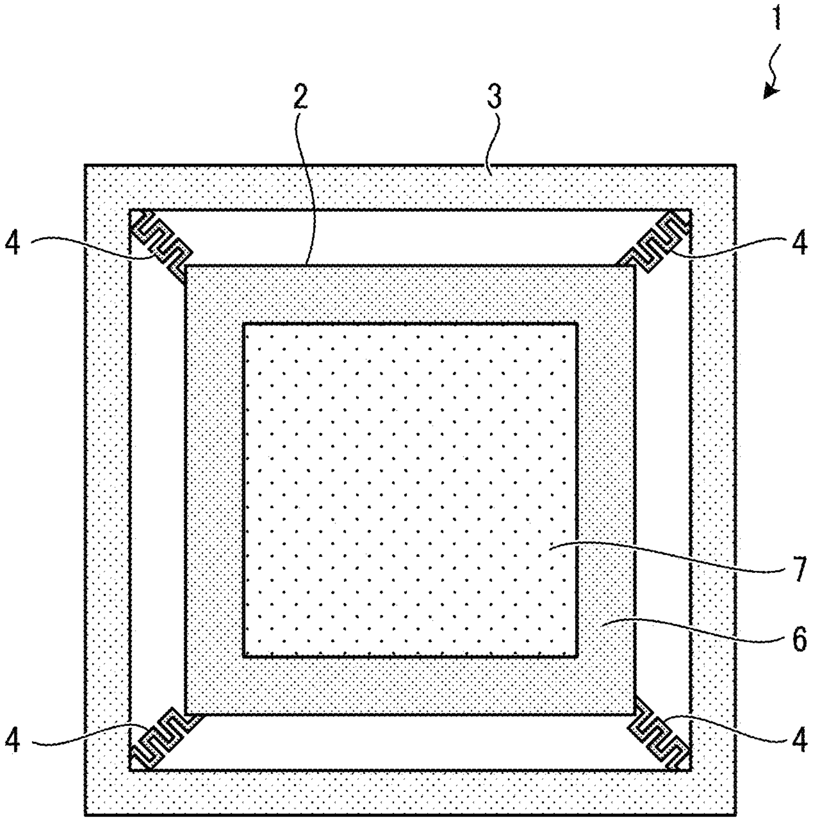
FIG. 13 is a plan view of an acoustic transducer according to a third embodiment.

FIG. 13 is a plan view of an acoustic transducer according to a third embodiment of the present disclosure. As illustrated in FIG. 13, the elastic member 4 according to the third embodiment has a meandering shape although the elastic member 4 according to the first embodiment and the second embodiment is rectangular.

The meander-shaped elastic members 4 allows a lower spring constant of each elastic member 4 as an elastic spring and shifts the frequencies of the antiresonance mode to lower frequencies, thus resulting in a higher design flexibility.

The acoustic transducer 1 according to each embodiment can be applied to various acoustic devices such as a speaker, an earphone, an electronic device, and a portable electronic device. Further, the acoustic transducer 1 according to each embodiment can also be applied to an ultrasonic oscillator that generates an ultrasonic wave using the vibration of the acoustic transducer 1.

In the above description, preferred embodiments of the present disclosure and the modifications of those embodiments of the present disclosure are described. While the present disclosure has been described herein with reference to specific embodiments, it will be apparent that various modifications and changes can be made thereto without departing from the broader spirit and scope of the invention as defined in the appended claims. Thus, the present disclosure should not be construed as being limited to the details of the embodiments and the accompanying drawings.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. An acoustic transducer comprising:
a vibration portion including:
a diaphragm; and
a vibrator on the diaphragm, the vibrator configured to drive the diaphragm;
a frame surrounding the vibration portion; and
a connecting portion connecting the vibration portion and the frame,
wherein the diaphragm includes multiple cutouts at portions of the diaphragm excluding a center portion thereof, and
wherein the vibrator is between two adjacent cutouts of the multiple cutouts.

2. The acoustic transducer according to claim 1,
wherein the connecting portion elastically connects the vibration portion and the frame to cause the vibration portion to vibrate resonantly in an out-of-plane direction of the vibration portion in one of two resonance modes including:
a resonance mode; and
an antiresonance mode, a phase of which is shifted by 180° with the resonance mode.

3. The acoustic transducer according to claim 2, wherein;

the acoustic transducer includes:

a first eigenvalue; and a second eigenvalue larger than the first eigenvalue, the connecting portion and the vibration portion vibrate at the same phase with the first eigenvalue, and the connecting portion and the vibration portion vibrate at the phases shifted by 180° from each other with the second eigenvalue.

4. The acoustic transducer according to claim 1, wherein the connecting portion includes a rectangular elastic member.

5. The acoustic transducer according to claim 1, wherein the connecting portion includes a meander-shaped elastic member.

6. The acoustic transducer according to claim 1, wherein;

the vibration portion has a square planar shape, and the connecting portion includes multiple connecting portions connecting four end portions of the vibration portion and the frame.

7. The acoustic transducer according to claim 1, wherein;

the vibration portion has a square planar shape, the connecting portion includes multiple connecting portions at four end portions of the vibration portion and side portions between the four end portions, and the multiple connecting portions connect the four ends and the frame, and connect the side portions and the frame.

8. The acoustic transducer according to claim 1, wherein;

the connecting portion causes the vibration portion to vibrate resonantly in two resonance modes, and the two resonance modes include:

a resonance mode in which the connecting portion and the vibration portion vibrate at the same phase; and an antiresonance mode in which the connecting portion and the vibration portion vibrate at the phases shifted by 180° from each other.

9. The acoustic transducer according to claim 1, wherein the diaphragm includes the multiple cutouts at four corners of the diaphragm.

10. An acoustic apparatus comprising the acoustic transducer according to claim 1.

11. An ultrasonic oscillator comprising the acoustic transducer according to claim 1.

* * * * *